UNITED STATES PATENT OFFICE.

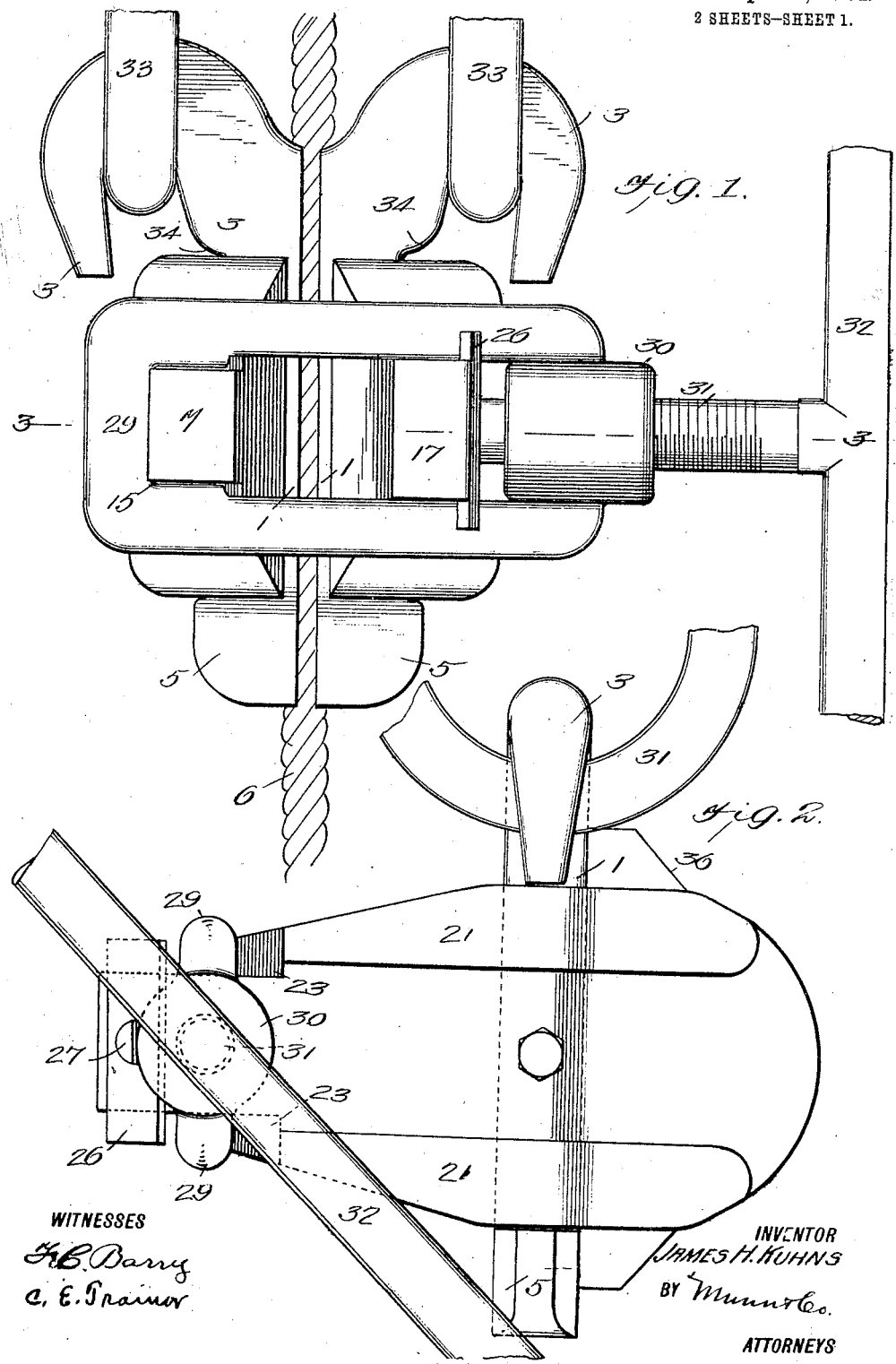

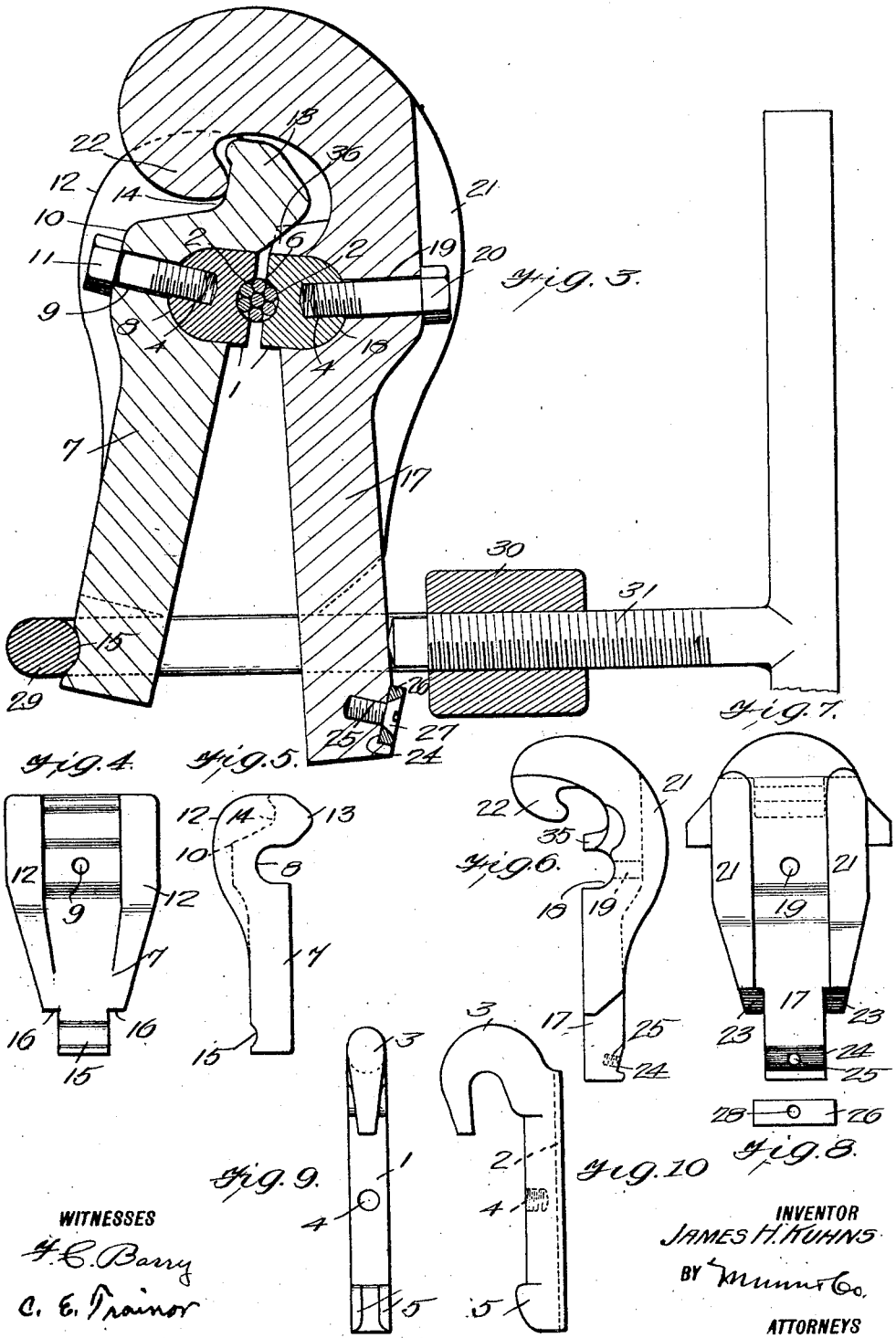

JAMES H. KUHNS, OF TULSA, OKLAHOMA, ASSIGNOR OF ONE-HALF TO OKLAHOMA IRON WORKS, OF TULSA, OKLAHOMA, A CORPORATION.

WIRE-LINE CLAMP.

1,111,543.

Specification of Letters Patent. Patented Sept. 22, 1914.

Application filed August 5, 1913. Serial No. 783,036.

*To all whom it may concern:*

Be it known that I, JAMES H. KUHNS, a citizen of the United States, and a resident of Tulsa, county of Tulsa, and State of Oklahoma, have made certain new and useful Improvements in Wire-Line Clamps, of which the following is a specification.

My invention is an improvement in wire line clamps, and has for its object to provide a simple, efficient clamp of the character specified, wherein mechanism is provided for engaging the line at any desired point, and so firmly and rigidly, that the desired amount of traction may be made upon the clamp to draw the wire, without slipping of the clamp.

In the drawings: Figure 1 is a front view of the improved clamp in position, Fig. 2 is an end view from the right of Fig. 1, Fig. 3 is a section on the line 3—3 of Fig. 1, Fig. 4 is a reduced view from the inner side of one of the clamping members, Fig. 5 is a side view of the same, Fig. 6 is a side view of the other member, Fig. 7 is a front view of the said other member, Fig. 8 is a front view of the cross plate in connection with the said last-named lever, Fig. 9 is a front view of one of the clamping jaws, and, Fig. 10 is a side view of the same.

The present embodiment of the invention comprises a pair of gripping jaws, each jaw consisting of a body 1, provided on its inner face with a longitudinally extending groove 2, for receiving the line, and having at its upper end a hook 3 extending toward the opposite side of the body from the face provided with the groove. Each of the jaws is provided intermediate the ends of the body with a threaded recess or opening 4, the said opening extending through approximately one-half the thickness of the body, and being on the opposite face from the groove. The lower end of each of the clamping jaws is provided on the opposite face from the groove, with a pair of parallel laterally spaced longitudinally extending ribs 5, for a purpose to be presently described. The clamping jaws 1 are arranged on opposite sides of the wire line 6, the said wire being received in the grooves 2 of the clamping jaws, and the jaws are held in place on the line by means of levers to be described. One of the levers 7 is provided near its upper end and on its inner face with a transverse groove 8 for receiving the adjacent jaw, and the said lever has an opening 9 extending through the lever from the opposite face, and intersecting the groove 8. The lever is also enlarged on its outer face at the groove 8, to strengthen the lever, as indicated at 10, and a set screw 11 is passed through the opening 8 and engages the opening 4 of the adjacent jaw 1, to hold the said jaw in the groove 8.

The outer face of the lever 7 is provided with longitudinally extending laterally spaced ribs 12, the said ribs being on opposite sides of the opening 9, and each rib extends from the upper end of the lever beyond the center thereof. The head of the set screw 11 is received between the ribs 12, and the said ribs are of sufficient height to extend outwardly beyond the outer face of the head of the screw. The lever is also provided at its upper end with an inwardly offset lug 13 for a purpose to be presently described, and the offsetting of the lug forms a notch or recess 14 on the outer face of the said lever at the upper end thereof, and above the enlargement 10, for a purpose to be later described. The lever 7 is also provided with a transverse groove 15 at its lower end, and on the outer face thereof, and at the said lower end the lever is reduced at each side as shown in Fig. 4, to form a shoulder 16 between that portion provided with the groove 15 and the remaining portion of the lever. The other lever 17 is provided intermediate its ends with a transverse groove 18 for receiving the adjacent jaw 1, and at the groove the lever is provided with an opening 19 extending from the outer face thereof and intersecting the groove 18.

A set screw 20 is passed through the opening 19, into engagement with the opening 4 of the adjacent jaw, and the outer face of the said lever is provided with longitudinally extending ribs 21, the said ribs being on opposite sides of the opening 19. The ribs 21 are of a height to extend beyond the outer face of the head of the set screw 20, as shown in Fig. 3, and the said ribs extend from near one end of the lever to near the other. At its upper end, the lever 17 is provided with a hook 22, the said hook extending beyond the inner face of the lever, and beyond the outer face of the other lever 7, and the hook engages the notch or recess 14 of the lever 7.

The lever 17 is reduced on each side at the end remote from the hook 22, to form shoulders 23 at each side thereof, and the outer face of the said lever at the reduced end is provided with a groove 24, and with a threaded opening 25 at the bottom of the groove. A plate 26 is arranged in the groove 24, and the lower side of the said groove is of the same depth as the width of the plate, so that at its lower side edge the outer face of the plate is flush with the outer face of the lever. The bottom of the groove is, however, inclined so that at the upper side edge of the plate, the under face of the plate is flush with the outer face of the lever.

A set screw 27 is passed through an opening 28 in the plate, and engages the opening 25 of the lever, to hold the plate 26 in place in the groove. A link, loop or bail 29 of rectangular form engages the ends of the levers 7 and 17 remote from the clamping jaws 1, one end of the link engaging in the groove 15 of the lever 7, while the side members of the link extend on opposite sides of the reduced ends of the levers. That end of the link remote from the lever 7 is provided with a nut 30, the axis of the nut being at the longitudinal center of the link, and a threaded rod 31 is engaged with the nut.

The rod is provided with a cross handle 32, and the inner end thereof engages the outer face of the lever 17, below the shoulders 23. It will be noted from an inspection of Figs. 1 and 2, that the plate 26 is of greater length than the width of the reduced portion of the lever 17, so that the ends of the plate extend beyond the sides of the reduced end of the lever. The said plate is of greater length than the width of the link, so that the ends of the plate prevent downward movement of the link. The hooks 3 of the clamping jaws 1 are engaged by the draft apparatus 33 for pulling the rope, the said draft apparatus having links, as shown for engaging the hooks.

In operation, the device is arranged as shown in Figs. 1 and 2, the clamping jaws 1 being held in the grooves 8 and 18 of the levers 7 and 17, by means of the set screws 11 and 20. With the clamping jaws in this position, the levers 7 and 17 are arranged on opposite sides of the wire 6, with the said wire in the grooves 2 of the clamping jaws, and with the lug 13 of the lever 7 on the inner side of the hook 22 of the lever 17. The bill of the hook 22 engages the recess 14 of the lever, and the ribs 12 and 21 of the two levers conceal and protect the heads of the set screws 11 and 20. With the levers so arranged, the link 29 is engaged at one end with the groove 15 of the lever 7, and the set screw 31 is turned by means of the handle, until the clamping jaws firmly grip the wire between them. The plate 26 prevents disengagement of the link from the lever 17, and also prevents slipping of the engaging end of the threaded rod 31.

The device is simple in construction, yet durable and efficient, and engages the wire with a rigid unslipable grip. As soon as the rope has been pulled as far as possible, with a single grip, the rod 31 is turned in the reverse direction, to relax the grip of the jaws 1, and a new grip is taken on the wire. The levers are of considerable width at the grooves 8 and 18, engaging the full length of the body of the gripping jaws. Each lever extends from the hook 3 to the commencement of the ribs 5, and the upper ends of the said ribs prevent lateral movement of the levers toward the ribs, while shoulders 34 are formed at the commencement of the hooks 3, to prevent movement of the levers toward the hooks.

It will be noticed from an inspection of Fig. 6, that the lever 17 is provided on its inner face above the groove 18, with an inwardly extending lug 35, and the said lug engages the adjacent side of the adjacent jaw 1, and also engages a notch 36 on the inner face of the lug 13. The gripping jaws may be released from the levers, merely by turning the set screws in the proper direction, and the jaws are thus interchangeable. The ribs 12 and 21 reinforce the levers, and the bail or link 29 may be removed from the levers, by removing the plate 26. It will be noticed that the levers are entirely independent, having neither screws, bolts or ties to hold them together, being engaged through the hook and the lug at the one end, and by means of a bail or loop 29 at the other. The lug 10 prevents lateral movement of the levers with respect to each other, and since the bill of the hook 22 fits between the ribs 12, the said hooks and ribs also prevent lateral movement. The jaws 1 are as before stated, interchangeable, and since the said jaws receive the entire strain when the device is in operation, should the said jaws become bent or broken, or injured in any other way, a new jaw may be inserted, or the old jaw may be taken out and straightened or repaired.

I claim:

1. A device of the character specified, comprising a pair of levers, one of the levers having a notch or recess at one end and on its outer face, the other lever having a hook for engaging the recess, the first-named lever having a transverse rib at the end of the recess to prevent accidental disengagement of the hook, said levers being grooved transversely on their inner faces adjacent to the connection, and the grooves registering, each lever having a transverse opening extending into the recess, a gripping jaw in each recess, each jaw having an open hook at its upper end, and a threaded opening registering with the opening of the adjacent lever, a set screw passing through each opening of the lever and engaging the threaded opening of the adjacent jaw, and a bail engaging the opposite ends of the levers, and having a nut adjacent to the lever provided with the hook, a screw threaded through the nut and bearing against the end of the lever, and a detachable stop plate on the lever for preventing disengagement of the screw, the outer face of the other lever being transversely grooved at the said end.

2. A device of the character specified, comprising a pair of levers, one of the levers having a notch or recess at one end and on its outer face, the other lever having a hook for engaging the recess, the first-named lever having a transverse rib at the end of the recess to prevent accidental disengagement of the hook, said levers being grooved transversely on their inner faces adjacent to the connection, and the grooves registering, each lever having a transverse opening extending into the recess, a gripping jaw in each recess, each jaw having an open hook at its upper end, and a threaded opening registering with the opening of the adjacent lever, a set screw passing through each opening of the lever and engaging the threaded opening of the adjacent jaw, and a bail engaging the opposite ends of the levers, for clamping them together, said bail having a nut at one lever, and a screw threaded through the nut and engaging the lever.

JAMES H. KUHNS.

Witnesses:
GEORGE RITTER,
JOSEPH S. HOPPING.